United States Patent [19]
Okumura et al.

[11] Patent Number: 5,270,815
[45] Date of Patent: Dec. 14, 1993

[54] IMAGE COMPRESSION PROCESSING APPARATUS HAVING MEANS FOR REMOVING JITTER CONTAINED AT BOUNDARY BETWEEN IMAGE AND MASK PORTIONS

[75] Inventors: Naoji Okumura, Minoh; Hirohiko Sakashita, Nara, both of Japan

[73] Assignee: Matsushita Electric Industrial Co., Ltd., Osaka, Japan

[21] Appl. No.: 791,225

[22] Filed: Nov. 13, 1991

[30] Foreign Application Priority Data

Nov. 14, 1990 [JP] Japan .................... 2-309385

[51] Int. Cl.⁵ .................................... H04N 7/01
[52] U.S. Cl. .................... 358/140; 358/149; 358/165
[58] Field of Search .............. 358/17, 19, 149, 143, 358/339, 141, 188, 140, 11, 12, 165

[56] References Cited

U.S. PATENT DOCUMENTS

| | | | |
|---|---|---|---|
| 4,015,288 | 3/1977 | Ebihara et al. | 358/339 X |
| 4,215,376 | 7/1980 | Mach | 358/339 X |
| 4,574,302 | 3/1986 | MacKereth | 358/150 X |
| 4,673,979 | 6/1987 | Kobo et al. | 358/147 X |
| 4,766,495 | 8/1988 | Kobayashi et al. | 358/160 X |

FOREIGN PATENT DOCUMENTS

| | | |
|---|---|---|
| 0326339 | 8/1989 | European Pat. Off. |
| 0381271 | 8/1990 | European Pat. Off. |
| 2237282 | 9/1990 | European Pat. Off. |

*Primary Examiner*—James J. Groody
*Assistant Examiner*—David E. Harvey
*Attorney, Agent, or Firm*—Wenderoth, Lind & Ponack

[57] ABSTRACT

Input analog image signals are converted to digital image signals and applied to a demodulation circuit and a synchronous circuit. In the demodulation circuit, the digital image signals are demodulated and then compressed by a compression circuit. In the synchronous circuit, the digital image signals are synchronously processed so as to output horizontal pulses in accordance with a horizontal synchronizing signal contained in the digital image signals and so as to output phase difference information denoting a timing difference between the output of a horizontal pulse and an interpolated crossing of the horizontal synchronizing signal across a synchronizing threshold. A boundary at an image portion and a mask portion of an output image signal is corrected so that the boundary is substantially free of jitter using the horizontal pulses and the phase difference information output by the synchronous circuit. In this manner, a smooth boundary is obtained at the image portion and mask portion of the final compressed image.

3 Claims, 9 Drawing Sheets video signal video signal    mask signal video signal    mask signal output signal video signal    mask signal

IMAGE COMPRESSION PROCESSING APPARATUS HAVING MEANS FOR REMOVING JITTER CONTAINED AT BOUNDARY BETWEEN IMAGE AND MASK PORTIONS

BACKGROUND OF THE INVENTION

The present invention generally relates to an image compression processing apparatus for compressing and displaying image signals denoting an image having a 4:3 aspect ratio on an image display apparatus having a 16:9 aspect ratio.

In recent years, image display apparatuses having a 16:9 aspect ratio and a high-definition receiver have been developed to obtain more realistic television images. However, the more conventional and still existing image signals denoting an image having a 4:3 aspect ratio must be displayed on such apparatuses. Various image compression processing devices are used for this purpose. That is, if original signals denoting a 4:3 image (for example, a circle) are displayed as is on a display apparatus having a 16:9 aspect ratio, the displayed image is expanded in the horizontal direction (to become, for example, an oval as shown in FIG. 1).

An example of the conventional image compression processing apparatus will be described hereinafter with reference to the drawings.

FIG. 1 shows a display image in which an original image signal for an image having a 4:3 aspect ratio is displayed as is on a display apparatus having a 16:9 aspect ratio. FIG. 2 is a block diagram of the conventional image compression processing apparatus. FIG. 3 shows a compression waveform chart thereof. FIG. 4 shows a display image when the image signal of the 4:3 aspect ratio has been compressed and displayed.

In FIG. 2, reference numeral 1 is an A/D converter for converting input signals into digital signals. Reference numeral 2 is a demodulation circuit for image demodulating the output signals of the A/D converter 1. Reference numeral 3 is a synchronous circuit for outputting horizontal pulses at a timing in accordance with clock signal pulses. Reference numeral 4 is a compression circuit for compressing the output signals of the demodulation circuit 2 in a horizontal direction in accordance with the horizontal pulses. Reference numeral 19 is a mask level generating circuit for generating mask levels. Reference numeral 20 is a switching circuit for selectively outputting the output signals of the compression circuit 4 and the mask levels of the mask level generating circuit 19 according to the horizontal pulses output by the synchronous circuit 3. Reference numeral 6 is a D/A converter for converting the output signals of the switching circuit 20 into analog signals.

The operation of the image compression circuit shown in FIG. 2 will be described hereinafter.

The inputted image signals are converted from analog signals to digital signals according to a clock, which is locked in phase to bursts, in an A/D converter 1. The converted digital signals are demodulated in the demodulation circuit 2 so that the demodulation signals A are outputted. The digital signals are also synchronously processed in a synchronous circuit 3 so as to output horizontal pulses D at a timing of a clock signal. In a compression circuit 4, the demodulation signals A, such as those shown in FIG. 3(a), are compressed in a horizontal direction to output compression signals B, such as those shown in FIG. 3(b). Mask levels generated in a mask level generating circuit 19 and the compression signals B are selectively output by a switching circuit 20 according to the horizontal pulses D to obtain output signals C composed of image signals and mask signals. Finally, the signals C are converted into analog signals and outputted by a D/A converter 6 to obtain a display image such as that shown in FIG. 4.

The above described construction suffers a drawback in that the horizontal pulses D are jittered as shown in FIG. 5(a) in a signal without bursts in it and in a signal of a non-standard signal like VCR, which causes jittering in the output signal C at the boundary of the image signal and mask signal as shown in FIG. 5(a), with a problem arising in that the image becomes awkward.

SUMMARY OF THE INVENTION

Accordingly, the present invention has been developed with a view to substantially eliminating the above discussed drawbacks inherent in the prior art, and has for its essential object to provide an improved image compression processing apparatus.

Another important object of the present invention is to provide an improved image compression processing apparatus for obtaining an image which is not jittered at the boundary between an image signal and a mask signal even in a signal without bursts in it and a non-standard signal like VCR.

In accomplishing these and other objects, according to one preferred embodiment of the present invention, there is provided an image compression processing apparatus which includes an A/D converter for converting inputted image signals into digital signals, a demodulation circuit for demodulating the output signals of the A/D converter, a synchronous circuit for synchronously processing the output signals of the A/D converter so as to output horizontal pulses and phase difference information, a compression circuit for compressing in a horizontal direction the output signals of the demodulation circuit using the horizontal pulses as a standard, a correcting circuit for masking image portions other than that of the image signals output by the compression circuit with the use of the horizontal pulses and the phase difference information, and a D/A converter for converting the output signals of the correcting circuit into analog signals.

The image compression processing apparatus of another embodiment of the present invention includes an A/D converter for converting inputted image signals into digital signals, a demodulation circuit for demodulating the output signals of the A/D converter, a synchronous circuit for synchronously processing the output signals of the A/D converter so as to output horizontal pulses and phase difference information, a compression circuit for compressing in a horizontal direction the output signals of the demodulation circuit using the horizontal pulses as a standard, a D/A converter for converting into analog signals the output signals of the compression circuit, a mask switching signal generating circuit for generating switching signals for masking the image portions other than that of the image signals with the use of the horizontal pulses and the phase difference information, a level generating circuit for generating masking signal levels, and a switching circuit for switching the output signals of the D/A converter and the output signals of the level generating circuit according to the output signals of the mask switching signal generating circuit.

In the present invention, image signals inputted by the A/D converter, the demodulation circuit, and the compression circuit (which are the same components as in the conventional image compression processing apparatus) in the above described first embodiment are compressed in the horizontal direction, the horizontal pulses and the phase difference information are outputted by the synchronous circuit, and the signals compressed in the correcting circuit and the mask levels are switched according to the horizontal pulses. In this case, the boundary of the switching is interpolated with the use of the phase difference information, and thereafter, is converted into analog signals by a D/A converter, and is outputted.

The image signals outputted by the D/A converter, the demodulation circuit, and the compression circuit (which are the same components as in the conventional image compression circuit) are compressed in the horizontal direction by the above described second embodiment, and the compressed signals are converted into analog signals by the D/A converter. The horizontal pulses and the phase difference information are outputted by the synchronous circuit so as to generate analog horizontal pulses having the phase difference information in the mask switching signal generating circuit. The compressed signals and the mask level generated by the level generating circuit are switched in accordance with the outputs of the mask switching signal generating circuit to obtain the output image signal.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Before the description of the present invention proceeds, it is noted that like parts are designated by like numerals throughout the accompanying drawings.

Figure 5A:
Figure 5B:
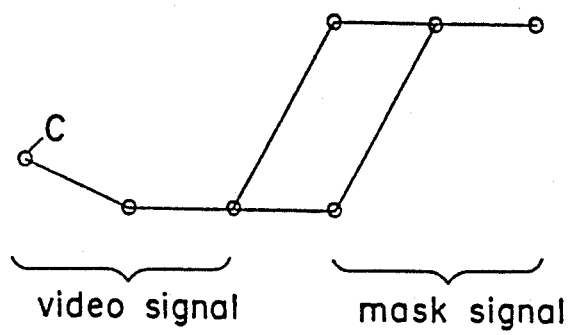
Figure 5C:
FIGS. 5(c) and 5(d) and FIG. 10 are respective waveform charts thereof.
Figure 5D:
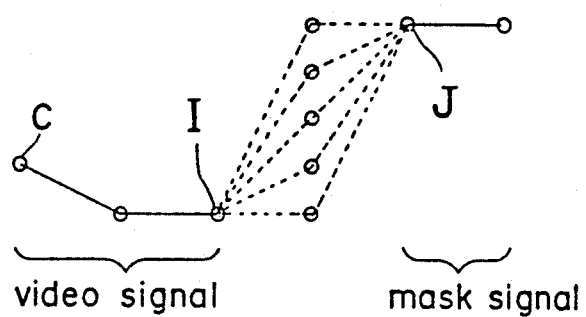
Figure 6:
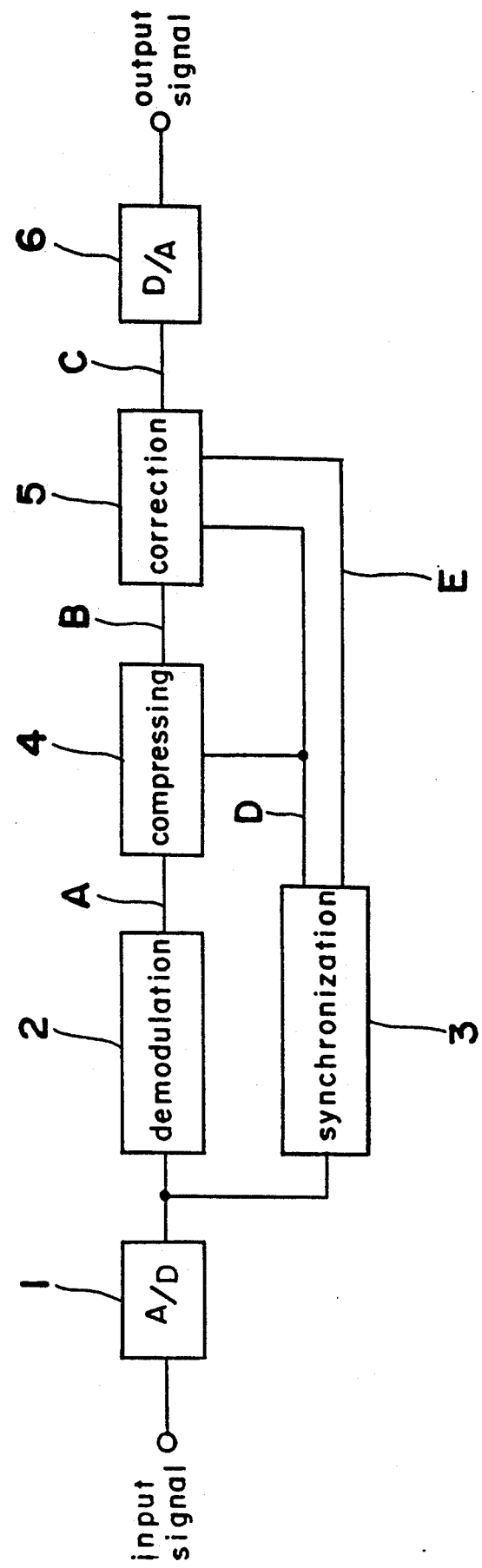
FIG. 6 is a block diagram of an image compression processing apparatus in one embodiment of the present invention.

Referring now to the drawings there is shown in FIG. 6 a block diagram of an image compression processing circuit, and in FIGS. 5(c) and 5(d) a waveform chart thereof, according to one preferred embodiment of the present invention.

In FIG. 6, reference numeral 1 is an A/D converter for converting inputted image signals into digital signals, reference 2 is a demodulation circuit for demodulating the output signals of the A/D converter 1, reference numeral 3 is a synchronous circuit for synchronously processing the output signals of the A/D converter 1 so as to output horizontal pulses D at a timing in accordance with a clock signal and so as to output phase difference information E, reference numeral 4 is a compression circuit for compressing in a horizontal direction the output signals A of the demodulation circuit 2 using the horizontal pulses output by the synchronous circuit 3 as a standard, reference numeral 5 is a correcting circuit for masking image portions other than that of the image signals B of the compression circuit 4 with the use of the horizontal pulses D and the phase difference information E from the synchronous circuit 3, and reference numeral 6 is a D/A converter for converting the output signals C of the correcting circuit 5 into analog signals.

The operation of the image compression processing apparatus of FIG. 6 will be described hereinafter with reference also to FIG. 3, FIG. 4, FIG. 5 and FIG. 10.

Inputted image signals are converted by the A/D converter 1 into digital signals from analog signals using a clock signal which is locked in phase to bursts. The converted digital signals are demodulated in the demodulating circuit 2 so that the demodulation signals A are outputted.

Figure 10:
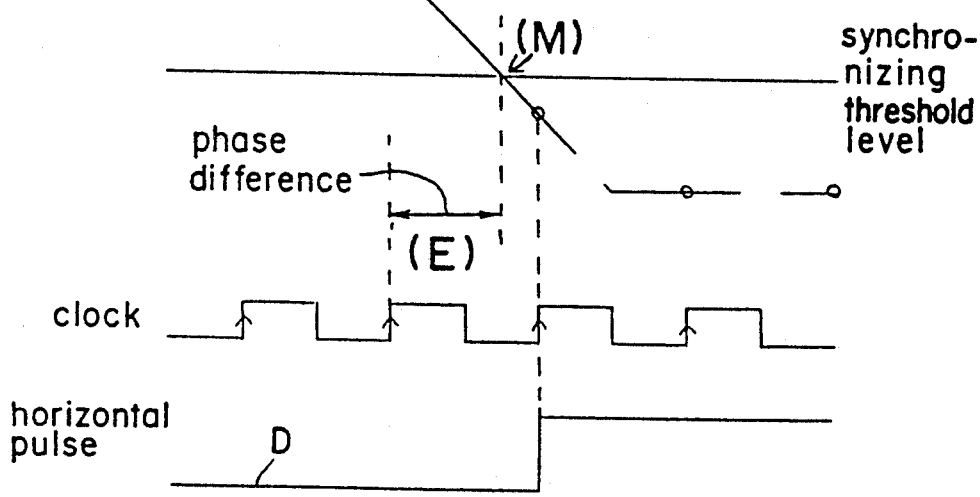

Referring to FIG. 10, a horizontal pulse D is generated by the synchronous circuit 3 at a timing corresponding to a rising edge of the clock signal when the sampled horizontal synchronizing signal (shown by small circles) falls below a synchronizing threshold level.

At the same time, the synchronous circuit 3 interpolates an intersection point M between the sampled horizontal synchronous signal and the synchronous threshold level so as to output a phase difference information E with respect to the clock signal as shown in FIG. 10.

Figure 1:
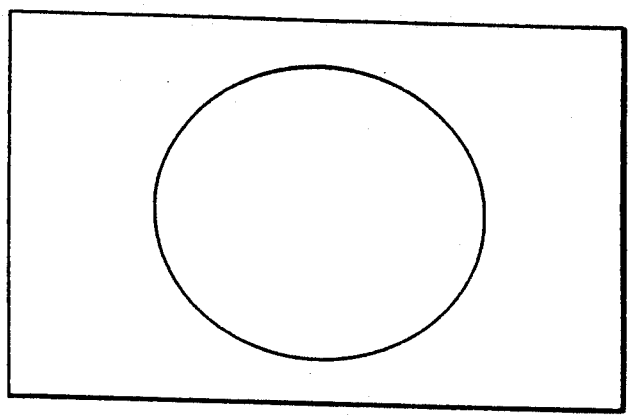
FIG. 1 and FIG. 4 are views each showing a display image.
Figure 4:
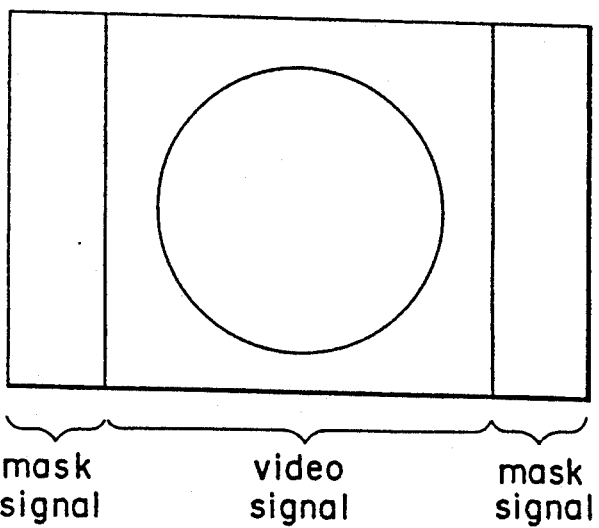
Figure 2:
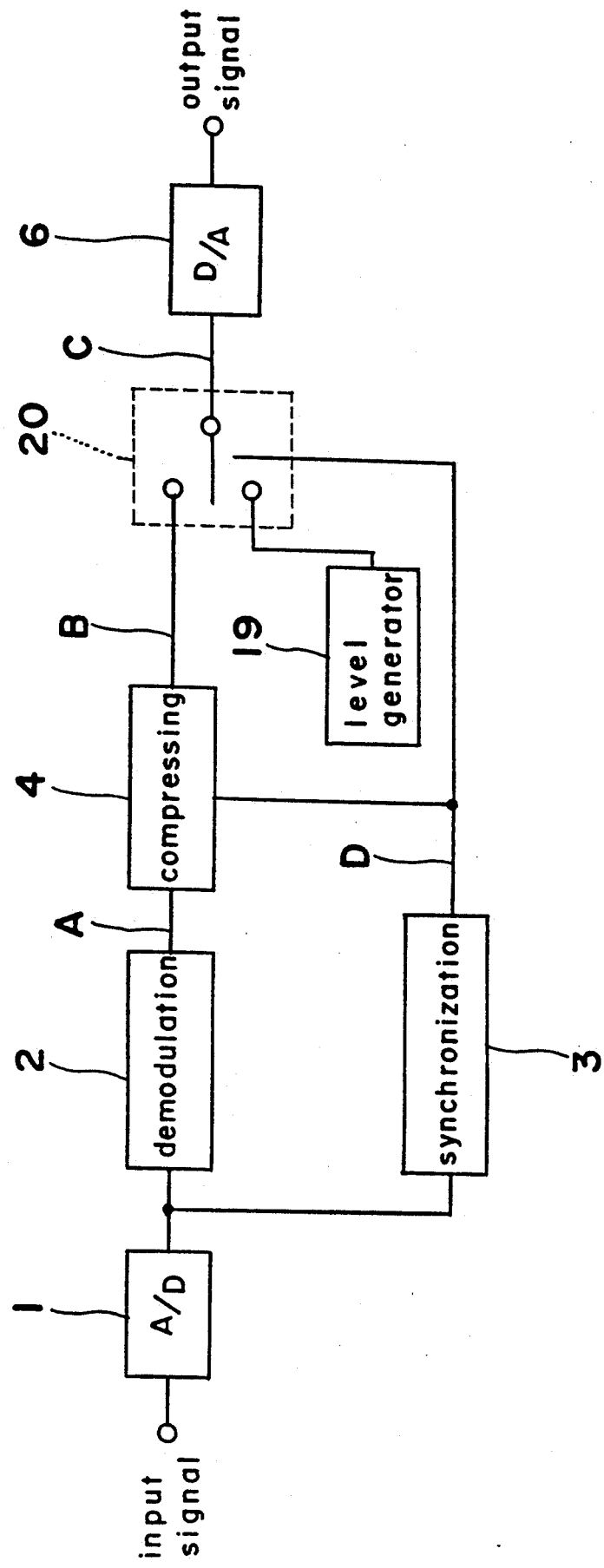
FIG. 2 is a block diagram of the conventional image compression processing apparatus.
Figure 3A:
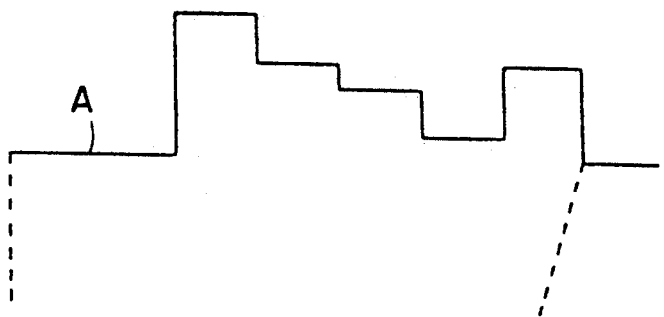
FIGS. 3(a) and 3(b) and FIGS. 5(a) and 5(b) are waveform charts thereof.
Figure 3B:
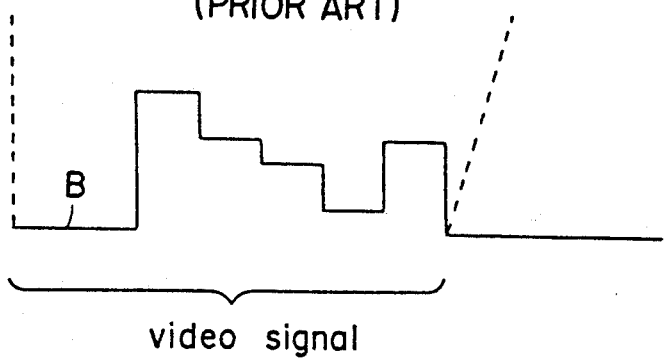

Demodulation signals A such as those shown in FIG. 3(a) output by the demodulation circuit 2 are compressed in the horizontal direction by the compression circuit 4 using the horizontal pulses D as a standard, so that compression signals B such as those shown in FIG. 3(b) are outputted. Then, the compression signals B and the mask signals are selectively output by the correction circuit 5 according to the horizontal pulses D and the phase difference information E. In particular, referring to FIGS. 5(c) and 5(d), the switching boundary between the last sample I of the compressed image signals and the first sample J of the mask signals is interpolated according to the difference in timing (denoted by the phase difference information E) between the generated horizontal pulse and the interpolated crossing of the sampled horizontal synchronizing signal below the synchronizing threshold level to thereby remove jitter at the boundary of image signals and mask signals of the output signals C. Finally, the signals C are converted into analog signals and outputted by the D/A converter 6 so that display images as shown in FIG. 4 are obtained.

Figure 7:
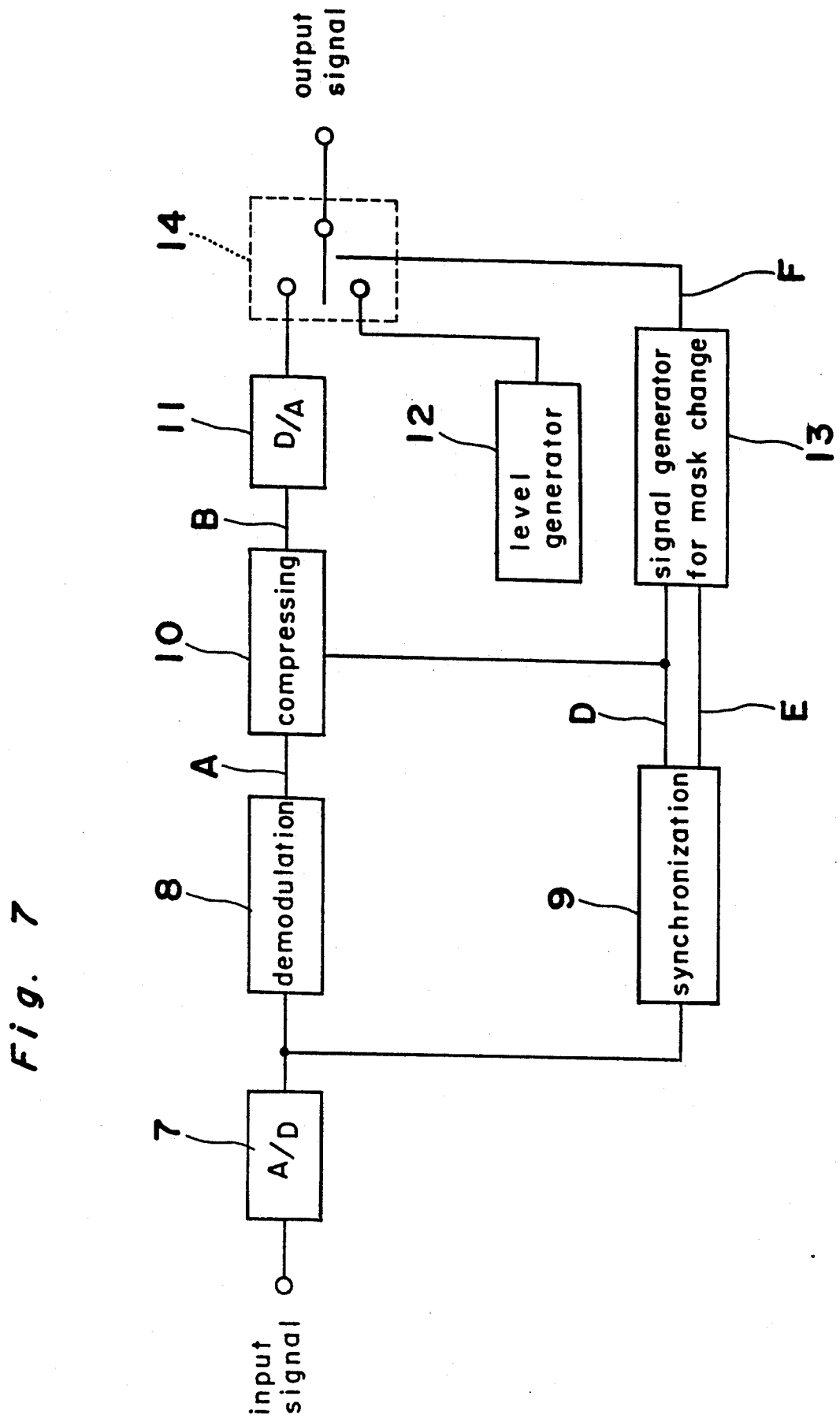
FIG. 7 is a block diagram of an image compression processing apparatus in another embodiment of the present invention.
Figure 8:
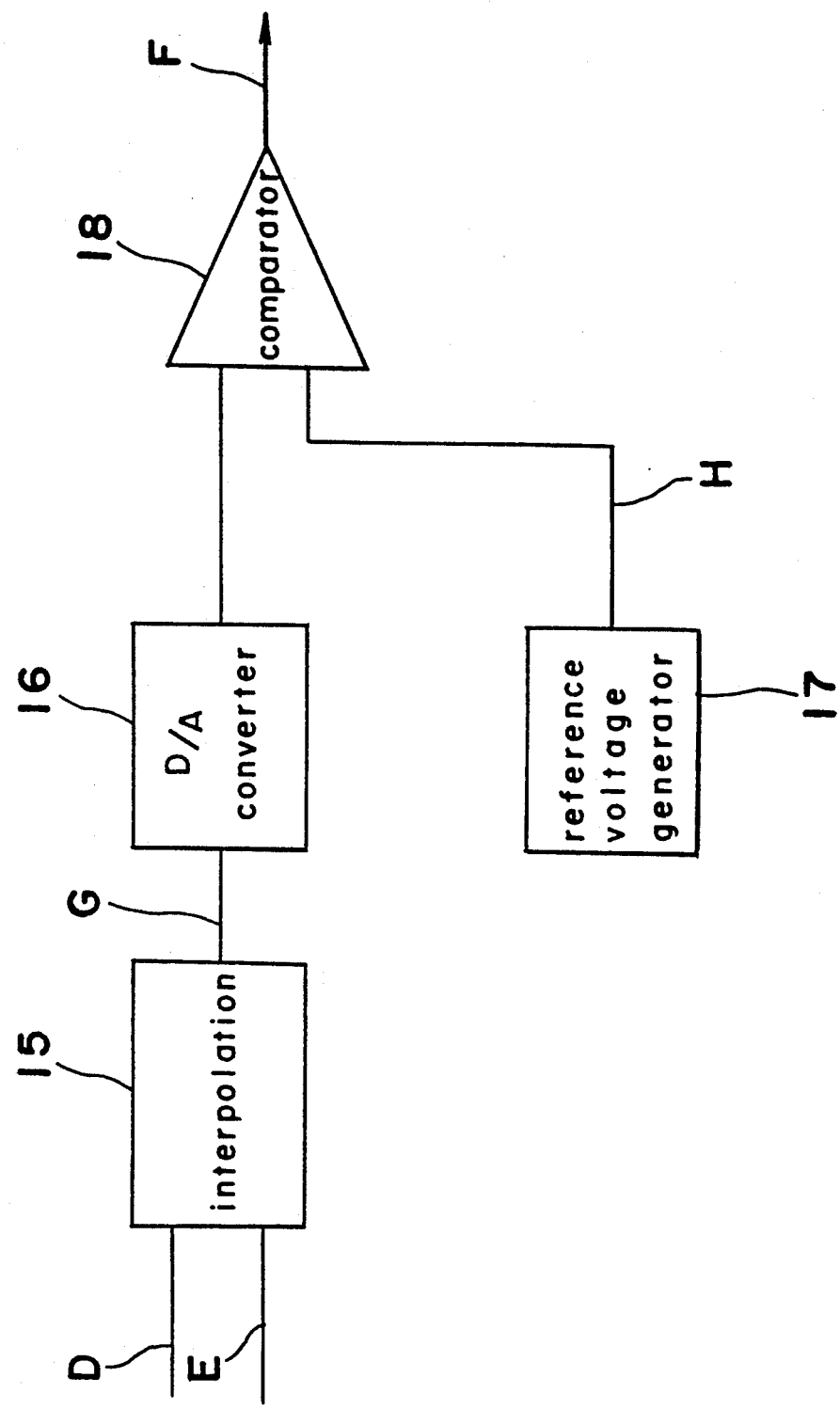
FIG. 8 is a block diagram of a mask switching signal generating circuit in the image compression processing apparatus of FIG. 7.

FIG. 7 shows a block diagram of an image compression processing apparatus in another embodiment of the present invention. FIG. 8 shows a block diagram of a mask switching signal generating circuit in the image compression apparatus of FIG. 7. FIG. 9 shows a waveform chart thereof.

In FIG. 7, reference numeral 7 is an A/D converter for converting the inputted image signals into digital signals, reference numeral 8 is a demodulation circuit for demodulating the output signals of the A/D converter 7, reference numeral 9 is a synchronous circuit for synchronously processing the output signals of the A/D converter 7 so as to output horizontal pulses D at a timing in accordance with a clock signal and so as to output pulse difference information E, reference numeral 10 is a compression circuit for compressing in a horizontal direction the output signals A of the demodulation circuit 8 using the horizontal pulses D output by the synchronous circuit 9 as a standard, reference numeral 11 is a D/A converter for converting the output signals B of the compression circuit 10 into analog signals, reference numeral 13 is a mask switching signal generating circuit for generating switching signals for masking image portions other than that of the image signals B with the use of the horizontal pulses D and the phase difference information E output by the synchronous circuit 9, reference numeral 12 is a mask level generating circuit for generating masking signal levels, and reference numeral 14 is a switching circuit for switching, according to output signals F of the mask switching signal generating circuit 13, between the output signals of the D/A converter 11 and the output signals of a mask level generating circuit 12.

In FIG. 8, reference numeral 15 is an interpolating circuit for interpolating the horizontal pulses D with the use of the phase difference information E, reference numeral 16 is a D/A converter for converting the output signals G of the interpolating circuit 15 into analog signals, reference numeral 17 is a reference voltage generating circuit for generating a standard voltage H, and reference numeral 18 is a comparator for comparing the output signals of the D/A converter 16 with the standard voltage H.

The operation of the image compression processing apparatus of FIG. 7 and FIG. 8 will be described below with reference also to FIG. 3 and FIG. 9.

The inputted image signals are converted by the A/D converter 7 into digital signals from analog signals using a clock which is locked in phase to bursts. The converted digital signals are demodulated in the demodulation circuit 8 so that the demodulation signals A are outputted. Also, in the synchronous circuit 9, the synchronous processing operation is effected, and the horizontal pulses D and the phase difference information E are outputted in the same manner as described above regarding the first embodiment. In the compression circuit 10, demodulation signals A such as those shown in FIG. 3(a) are compressed in the horizontal direction using the horizontal pulses D as a standard, and the compression signals B such as those shown in FIG. 3(b) are outputted and then converted into analog signals by a D/A converter 11.

Figure 9A:
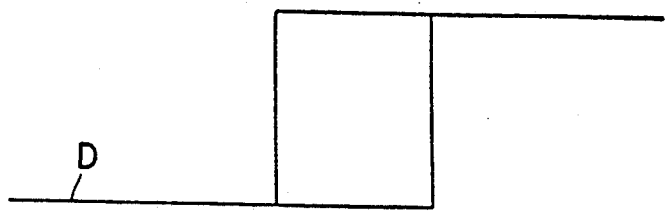
FIGS. 9(a) to 9(d) are waveform charts thereof.
Figure 9B:
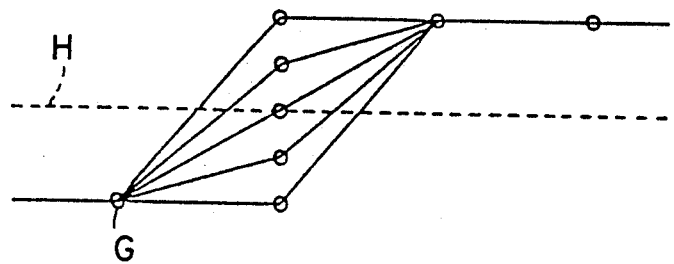
Figure 9C:
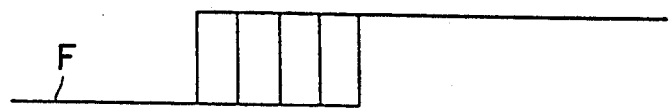
Figure 9D:
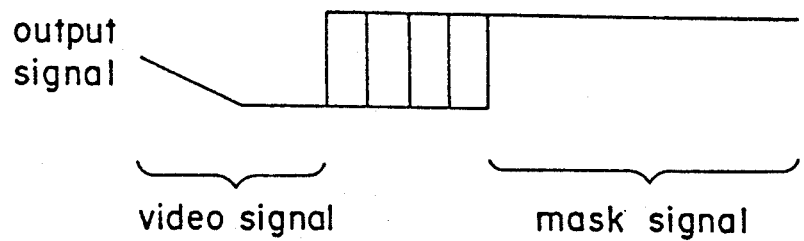

Also, in the interpolating circuit 15, the horizontal pulses D of FIG. 9(a) are interpolated using the phase difference information E to output digital signals G shown in FIG. 9(b) which are converted into analog signals by the D/A converter 16. The analog signals are compared with the standard voltage H (shown in the FIG. 9(b) and generated by the reference voltage generating circuit 17) by the comparator 18 so as to output the signal F shown in FIG. 9(c). In this manner, the output signals F of the comparator 18 become horizontal pulses containing phase difference information. In the switching circuit 14, the outputs of the mask level generating circuit 12 for generating the mask levels and the output signals of the D/A converter 11 which are the compressed image signals are switched and outputted in accordance with the output signals F of the comparator 18 to obtain the output image signal shown in FIG. ((d).

As is clear from the foregoing description, according to the arrangement of the first embodiment of the present invention configured by the A/D converter, the modulation circuit, the synchronous circuit, the compression circuit, the correcting circuit and, the D/A converter, the switching boundary between the compressed signals and the mask levels is interpolated with the use of the phase difference information, so that the image located at the boundary between the image signals and the mask signals is not jittered even in signals without bursts therein and the non-standard signals like VCR can be provided.

Also, according to the arrangement of the second embodiment of the present invention configured by the A/D converter, the demodulation circuit, the synchronous circuit, the compression circuit, the D/A converter, the mask switching signal generating circuit, the level generating circuit, and the switching circuit, the horizontal pulses are interpolated using the phase difference information to obtain analog mask switching signals, and the compressed signals and the mask levels are switched using the analog mask switching signals containing the phase difference information so that the image located at the boundary between the image signals and the mask signals is not jittered even in signals without bursts therein and the non-standard signals like VCR can be provided.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claim is:

1. An image compression processing apparatus comprising:
    an A/D converter for analog-to-digital converting inputted analog image signals so as to output corresponding digital image signals;
    a demodulation circuit for demodulating said digital image signals so as to output demodulation image signals;
    a synchronous circuit for synchronously processing said digital image signals so as to output horizontal pulses in accordance with a horizontal synchronizing signal contained in said digital image signals at a timing corresponding to pulses of a clock signal and so as to output phase difference information denoting a timing difference between the output of a horizontal pulse and an interpolated crossing of said horizontal synchronizing signal contained in said digital image signals across a synchronizing threshold;
    a compression circuit for compressing in a horizontal image direction said digital image signal using said horizontal pulses output by said synchronous circuit as a standard so as to output a compressed digital image signal;
    a correction circuit for masking image portions other than an image of said compressed digital image signal so as to obtain a digital output image signal denoting an output image and for correcting a boundary of said output image between said masked image portions and said image of said compressed digital image signal such that said boundary is substantially free of jitter using said horizontal pulses and said phase difference information output by said synchronous circuit; and, a D/A converter for digital-to-analog converting said digital output image signal so as to output an analog output image signal.

2. An image compression processing apparatus comprising:

an A/D converter for analog-to-digital converting inputted analog image signals so as to output corresponding digital image signals;

a demodulation circuit for demodulating said digital image signals so as to output demodulated image signals;

a synchronous circuit for synchronously processing said digital image signals so as to output horizontal pulses in accordance with a horizontal synchronizing signal contained in said digital image signals at a timing corresponding to pulses of a clock signal and so as to output phase difference information denoting a timing difference between the output of a horizontal pulse and an interpolated crossing of said horizontal synchronizing signal contained in said digital image signals across a synchronizing threshold;

a compression circuit for compressing in a horizontal image direction said digital image signals using said horizontal pulses output by said synchronous circuit as a standard so as to output a compressed digital image signal;

a D/A converter for digital-to-analog converting said compressed digital image signal to output a compressed analog image signal;

a mask switching signal circuit for generating switching signals in accordance with said horizontal pulses and said phase difference information output by said synchronous circuit;

a mask signal generating circuit for generating a mask signal; and, a switching circuit for selectively outputting said compressed analog image signal and said masking signal in accordance with said switching signals generated by said mask switching signal circuit, wherein said mask switching generating signal circuit generates said switching signals at a timing which causes said switching circuit to mask image portions other than an image of said compressed analog image signal to obtain an analog output image signal denoting an output image having a boundary between said masked image portions and said image of said compressed digital image signal which is substantially free of jitter.

3. An image compression processing apparatus as claimed in claim 2, wherein said mask switching signal generating circuit comprises:

an interpolating circuit for receiving said horizontal pulses and generating corresponding interpolated horizontal pulses in accordance with said phase difference information;

a second D/A converter for digital-to-analog converting said interpolated horizontal pulses so as to output a corresponding analog signal;

a reference voltage generator for generating a reference voltage; and, a comparator for comparing said analog signal and said reference voltage so as to output a corresponding comparison signal as said switching signals.

* * * * *